(12) United States Patent
Chiba et al.

(10) Patent No.: US 12,244,200 B2
(45) Date of Patent: Mar. 4, 2025

(54) VIBRATION ACTUATOR

(71) Applicant: FOSTER ELECTRIC COMPANY, LIMITED, Tokyo (JP)

(72) Inventors: Yusuke Chiba, Tokyo (JP); Yoshikazu Okazaki, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 433 days.

(21) Appl. No.: 17/434,018

(22) PCT Filed: Feb. 27, 2020

(86) PCT No.: PCT/JP2020/007969
§ 371 (c)(1),
(2) Date: Aug. 26, 2021

(87) PCT Pub. No.: WO2020/175610
PCT Pub. Date: Sep. 3, 2020

(65) Prior Publication Data
US 2022/0140718 A1     May 5, 2022

(30) Foreign Application Priority Data
Feb. 27, 2019    (JP) ................................. 2019-034632

(51) Int. Cl.
*H02K 33/18*     (2006.01)
(52) U.S. Cl.
CPC .................................... *H02K 33/18* (2013.01)
(58) Field of Classification Search
CPC ........ H02K 33/18; H02K 23/28; H02K 33/12; B06B 1/045

(Continued)

(56) References Cited

U.S. PATENT DOCUMENTS 6,105,943 A * 8/2000 Nagasawa ............... H02K 33/12
                                              267/140.14
6,653,753 B1 * 11/2003 Kawano ................. H02K 33/16
                                               310/12.24

(Continued)

FOREIGN PATENT DOCUMENTS

CN        102971947       3/2013
CN        104638872       5/2015

(Continued)

OTHER PUBLICATIONS

Miwa Nagayasu. "Linear Actuator". (2013). English Machine Translated. (Year: 2013).*
Ashiya Naoki. "Inductance Component". (2015). English Machine Translated. (Year: 2015).*

(Continued)

*Primary Examiner* — Terrance L Kenerly
*Assistant Examiner* — Theodore L Perkins
(74) *Attorney, Agent, or Firm* — JCIPRNET

(57) ABSTRACT

A vibration actuator that can prevent reduction of vibration performance and durability of the vibration actuator and that can prevent occurrence of operation failure and noise when the vibration actuator had impact from the outside is provided. The vibration actuator includes a cylindrical casing having a first coil and a second coil, a movable element arranged inside the casing and having a magnet, and a first inner guide and a second inner guide arranged between the first coil and the second coil, and the movable element 4 and having extending portions and which sandwich and hold a part of the first coil and the second coil together with the casing.

4 Claims, 7 Drawing Sheets

(58) Field of Classification Search
USPC .......................................................... 310/28
See application file for complete search history.

(56) References Cited

U.S. PATENT DOCUMENTS

| | | | | |
|---|---|---|---|---|
| 9,212,661 | B2* | 12/2015 | Fukasaku | ................. H02K 3/24 |
| 2006/0049701 | A1* | 3/2006 | Sato | ....................... H02K 33/12 |
| | | | | 310/12.21 |
| 2009/0079276 | A1* | 3/2009 | Ueda | ........................ F25B 9/14 |
| | | | | 310/28 |
| 2013/0169071 | A1 | 7/2013 | Endo et al. | |
| 2014/0070633 | A1* | 3/2014 | Kim | ....................... B06B 1/045 |
| | | | | 310/25 |
| 2015/0137627 | A1 | 5/2015 | Katada et al. | |
| 2016/0006331 | A1* | 1/2016 | Hong | .................... F04B 35/045 |
| | | | | 310/28 |
| 2017/0191666 | A1* | 7/2017 | Bales | ....................... F02C 7/22 |
| 2017/0227784 | A1* | 8/2017 | Yu | ...................... H02K 41/0356 |
| 2017/0288523 | A1* | 10/2017 | Katada | ................. H02P 25/032 |

FOREIGN PATENT DOCUMENTS

| | | | |
|---|---|---|---|
| CN | 104901501 | | 9/2015 |
| JP | S6145745 | | 12/1986 |
| JP | 2004195444 | | 7/2004 |
| JP | 2011153692 | | 8/2011 |
| JP | 2013126299 | | 6/2013 |
| JP | 2013126299 A | * | 6/2013 |
| JP | 2015060849 A | * | 3/2015 |
| JP | 2015091585 | | 5/2015 |
| JP | 5775233 | | 9/2015 |
| JP | 2016013554 | | 1/2016 |
| JP | 2016032417 | | 3/2016 |

OTHER PUBLICATIONS

"Search Report of Europe Counterpart Application", issued on Mar. 7, 2022, pp. 1-10.
"International Search Report (Form PCT/ISA/210) of PCT/JP2020/007969," mailed on May 19, 2020 , with English translation thereof, pp. 1-4.

* cited by examiner

VIBRATION ACTUATOR

CROSS-REFERENCE TO RELATED APPLICATION

This application is a 371 application of the International PCT application serial no. PCT/JP2020/007969, filed on Feb. 27, 2020, which claims the priority benefit of Japan Patent Application no. 2019-034632, filed on Feb. 27, 2019. The entirety of each of the above mentioned patent applications is hereby incorporated by reference herein and made a part of this specification.

FIELD OF INVENTION

The present disclosure relates to a vibration actuator.

BACKGROUND

Conventionally, in communication devices such as mobile phones, to notify users of phone calls and alarms, a notification method by vibration using vibration actuators (or vibration motors) may be used. Furthermore, in recent years, the vibration actuators are used in the field of movies, games, and VR (virtual reality) for stage effects in action scenes and feedback means to players, for example, to improve the reality thereof by stimulating a sense of touch of human by vibration.

Although vibration actuators in which an eccentric mass is rotated by a motor to generate vibration by inertial force are conventionally used, there are products which employ voice-coil type vibration actuators which have fast vibration response and realistic tactile impression. Said vibration actuators have a structure in which a movable element such as a spindle is reciprocally vibrated, and the spindle is supported inside a casing by an elastic body such as spring and rubber.

For example, a vibration actuator having a structure in which an axis fixed at both ends of the movable element by a disc-shaped rubber component is disclosed (refer Patent Document 1). Furthermore, a vibration actuator having a structure in which the movable element is supported by compression coil spring and leaf spring is disclosed (refer Patent Document 2).

PRIOR ART DOCUMENT

Patent Document

Patent Document 1: Japanese Utility Model Publication S61-45745
Patent Document 2: Japanese Patent No. 5775233

SUMMARY OF INVENTION

Problems to be Solved by Invention

However, when the vibration actuator had impact from the outside, the movable element which is supported elastically swings and interferes with an electromagnetic driving component such as a coil arranged to have a slight gap between an outer circumference of the movable element, resulting in deformation and damage occur in said component which may cause operation failure and noise. In particular, impact for example by falling is inevitable when the vibration actuator is used in mobiles phones and game controllers.

For example, in a vibration actuator according to Patent Document 1, a coil casing in which a coil is attached to an inner circumference thereof is inserted and is fixed in the inner circumference of a yoke having a substantially cylindrical shape, and a movable element is only supported by a supporting component made of rubber material. Therefore, the vibration actuator contacts with the coil when the movable element moves in the radial direction (direction perpendicular to the vibration direction) when the vibration actuator had impact from the outside.

Meanwhile, in a vibration actuator according to Patent Document 2, a shaft (axis) along the vibration direction penetrates the movable element, and since the movable element vibrates along the shaft, movement is the radial direction is restricted. Furthermore, since the inner circumference of the coil is covered by a bobbin, the movable element and the coil are not in direct contact with each other.

However, although adhesion by adhesives are used in a joining of the coil casing vibration actuator according to Patent Document 1 and the coil and in a joining of the bobbin to the casing according to Patent Document 2, the joining may break and the coil and the bobbin may come off when the vibration actuator had impact from the outside.

Furthermore, in the configuration in which the entire coil is covered by the bobbin like the vibration actuator according to Patent Document 2, heat dissipation of the coil is reduced, and insulation of the coil may deteriorate faster.

The present disclosure is achieved to address such problems, and the objective thereof is to provide a vibration actuator that can prevent reduction of vibration performance and durability of the vibration actuator and that can prevent occurrence of operation failure and noise when the vibration actuator had impact from the outside.

Means to Solve the Problem

To achieve the above objective, a vibration actuator according to the present disclosure includes:
a cylindrical casing having a coil;
a movable element arranged inside the casing and having a magnet;
an inner guide arranged between the coil and the movable element and having an extending portion which sandwiches and holds a part of the coil together with the casing.

In the above vibration actuator, the part of the coil may be exposed, sandwiched and held by the casing and the extending portion of the inner guide.

Furthermore, in the above vibration actuator, the casing and the inner guide may be formed by same material, and the casing and the inner guide may be welded to each other.

Furthermore, the above vibration actuator may include a leaf spring having a plurality of arms which supports the movable element inside the casing, and the inner guide may be positioned at a center-side of the casing than the leaf spring in an axial direction inside the casing and may restrict a movement of the leaf spring.

Furthermore, in the above vibration actuator, the coil may include a first coil provided at one side in the axial direction of the casing and a second coil provided at other side in the axial direction of the casing, and the inner guide may include a first inner guide arranged between the first coil and the movable element and having an extending portion which sandwiches and holds the first coil together with the casing and a second inner guide arranged between the second coil and the movable element and having an extending portion which sandwiches and holds the second coil together with the casing.

Effect of Invention

By the vibration actuator according to the present disclosure using the above means, reduction of vibration performance and durability of the vibration actuator can be prevented and occurrence of operation failure and noise when the vibration actuator had impact from the outside can be prevented.

EMBODIMENTS

In below, an embodiment according to the present disclosure is described based on figures.

Figure 1:
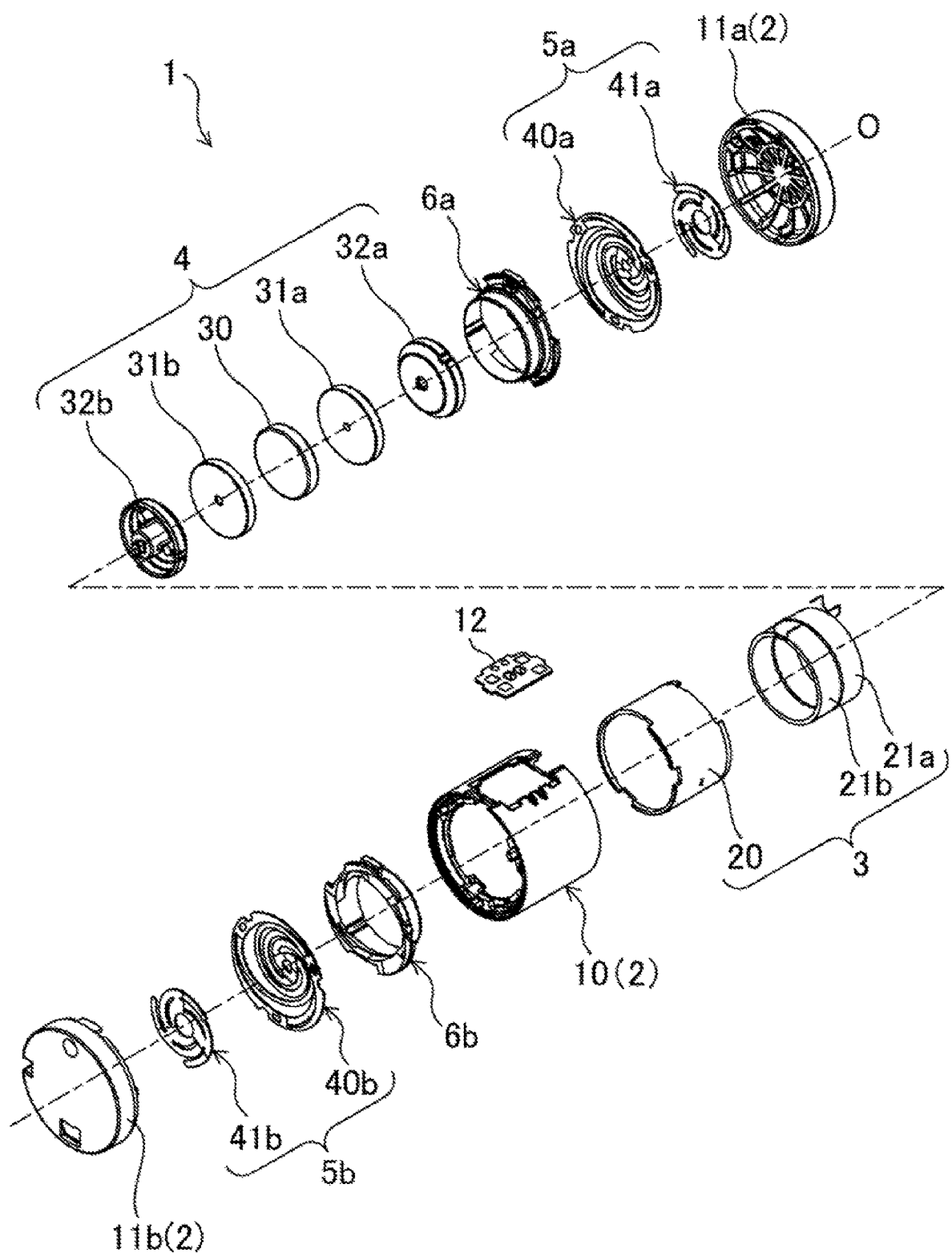
FIG. 1 is an exploded perspective view of the vibration actuator according to an embodiment of the present disclosure.
Figure 2:
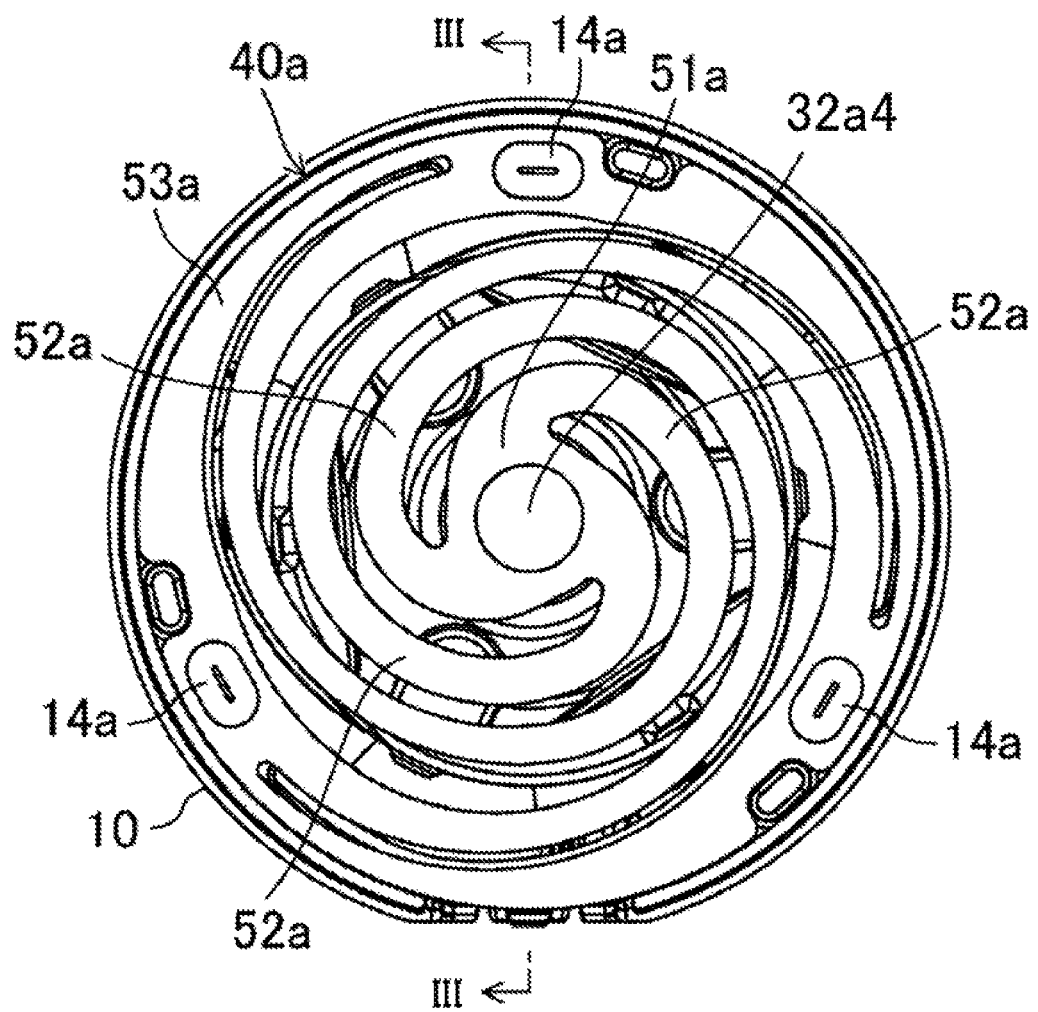
FIG. 2 is a top view of the vibration actuator in which a first cover casing and a first elastic component are omitted.
Figure 3:
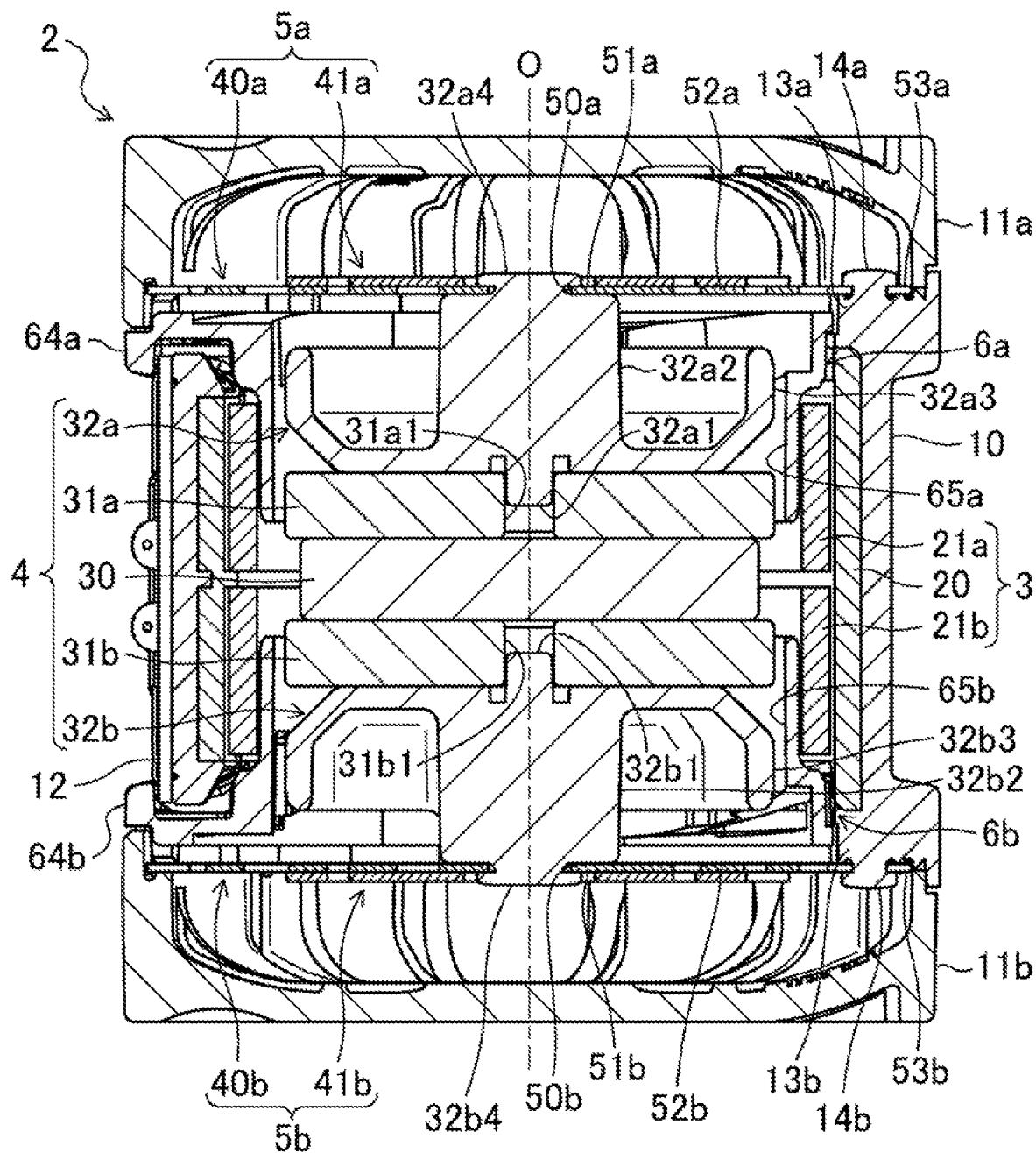
FIG. 3 is a cross-sectional view of FIG. 2 along a cutting line III-III.
Figure 4A:
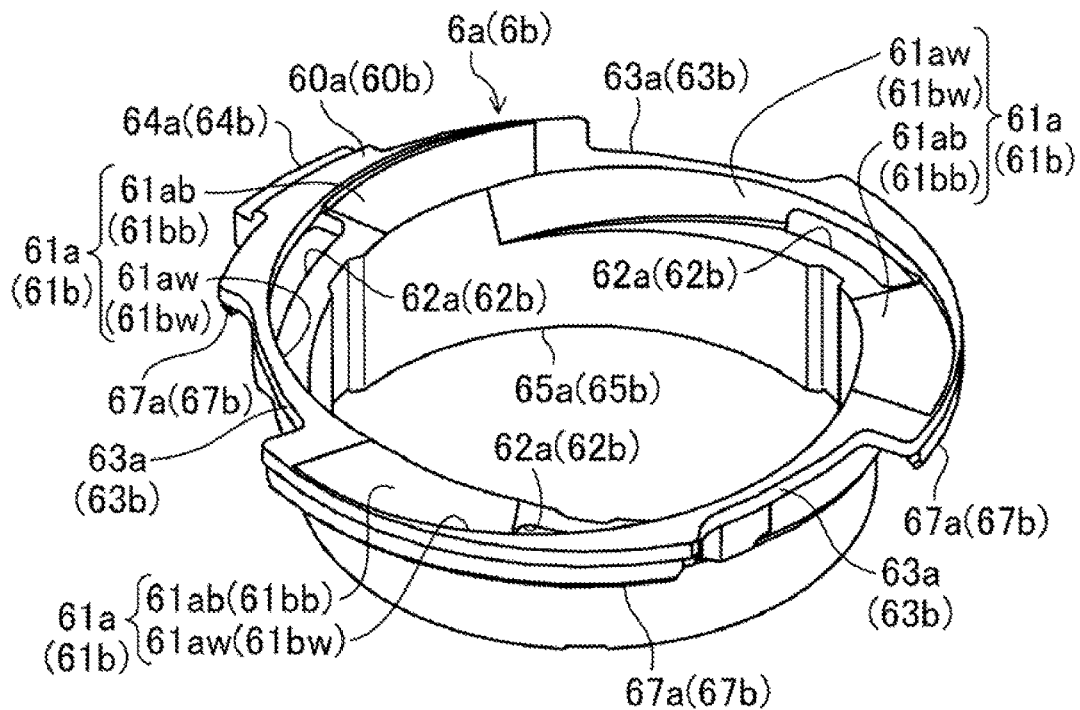
FIG. 4a is a perspective view of a first inner guide (second inner guide).
Figure 4B:
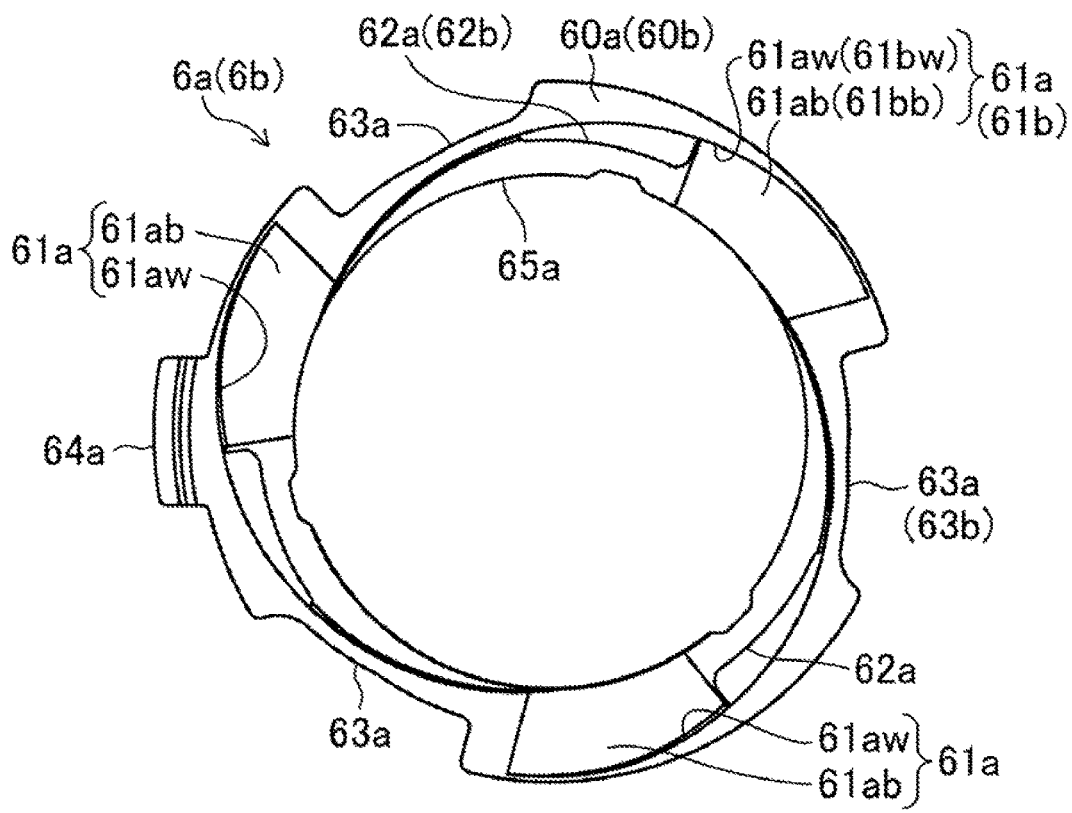
FIG. 4b is a top view of the first inner guide.
Figure 5:
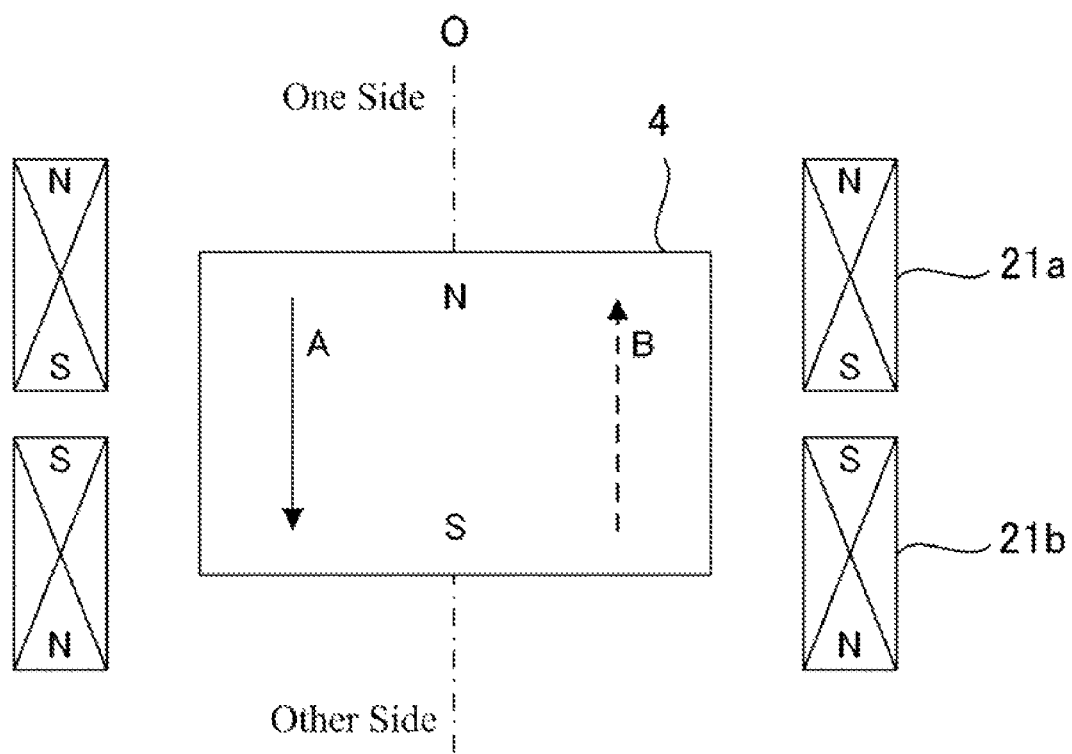
FIG. 5 is a diagram describing an operation of the vibration actuator.
Figure 6A:
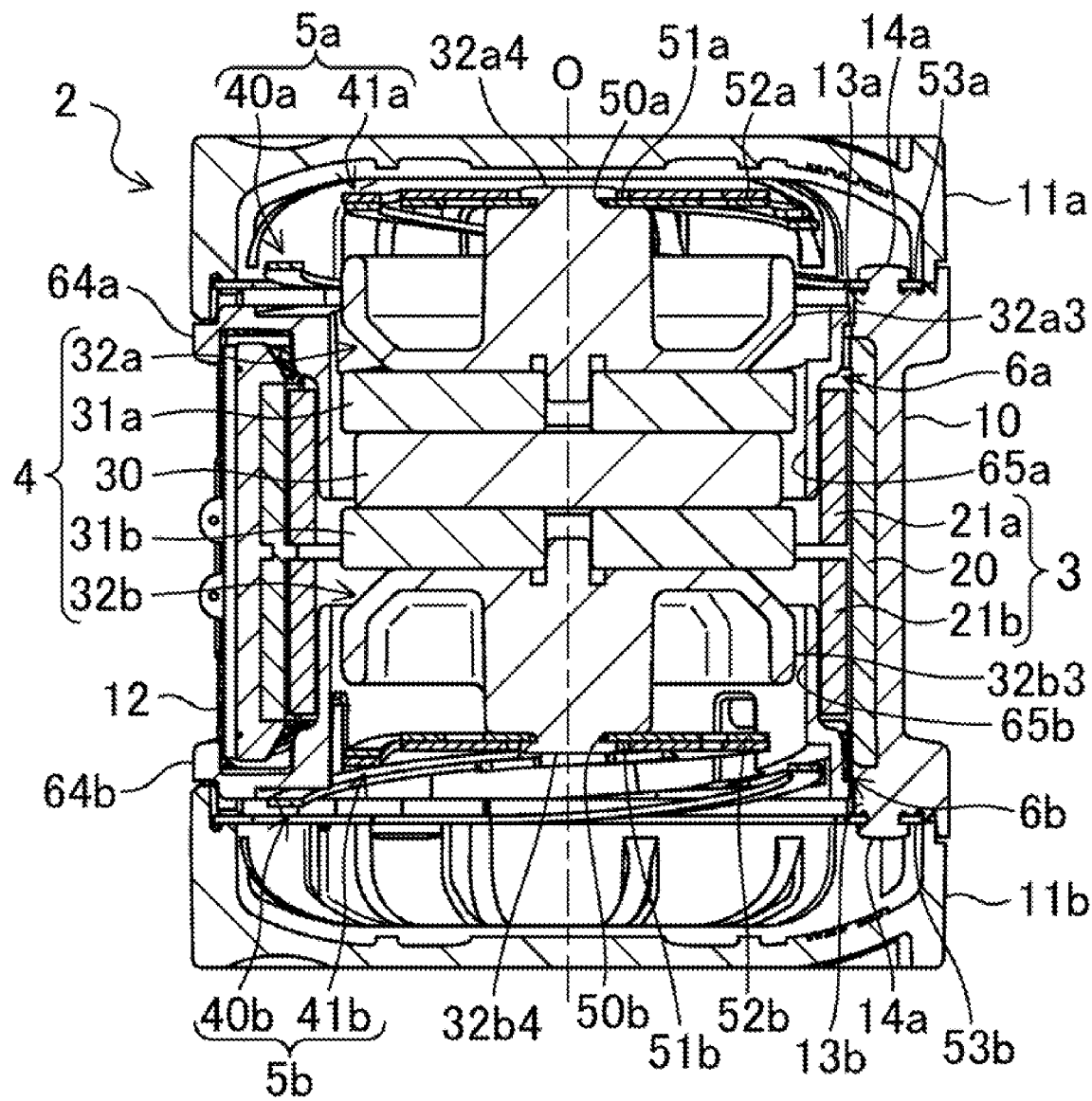
FIG. 6a is a cross-sectional view of a state in which a movable element is moved to one side in a vibration axial direction.
Figure 6B:
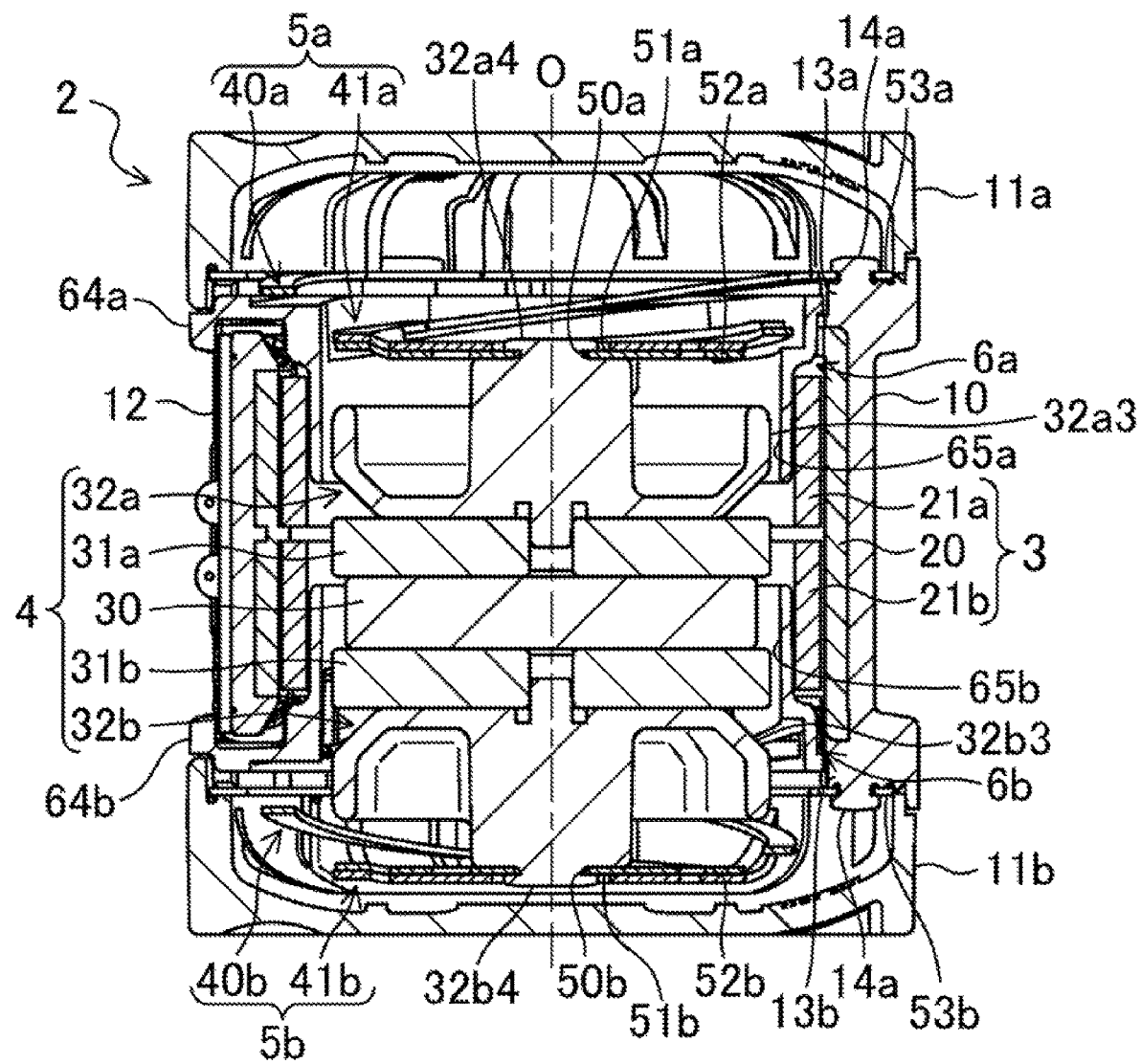
FIG. 6b is a cross-sectional view of a state in which a movable element is moved to other side in a vibration axial direction.

FIG. 1 is an exploded perspective view of a vibration actuator according to an embodiment of the present disclosure, FIG. 2 is a top view of the vibration actuator in which a first cover casing and a first elastic component are omitted, FIG. 3 is a cross-sectional view of FIG. 2 along a cutting line III-III, FIG. 4a is a perspective view of a first inner guide (second inner guide), FIG. 4b is a top view of the first inner guide, FIG. 5 is a diagram describing an operation of the vibration actuator, FIG. 6a is a cross-sectional view of a state in which a movable element is moved to one side in a vibration axial direction, and FIG. 6b is a cross-sectional view of a state in which a movable element is moved to other side in a vibration axial direction. In below, a configuration of the vibration actuator is described based on these figures.

A vibration actuator 1 mainly includes a cylindrical casing 2 that forms an outer shell, a casing-side electromagnetic driving portion 3 provided inside the casing 2, a movable element 4 that can vibrate by the casing-side electromagnetic driving portion 3, a first supporting unit 5a and a second supporting unit 5b that elastically support both side of the movable element 4 respectively, and a first inner guide 6a and a second inner guide 6b that restrict movement of the first supporting unit 5a and the second supporting unit 5b. The vibration actuator 1 is implemented on, for example, mobile terminals such as mobile phones and smartphones, and game controllers.

The casing 2 includes a cylindrical casing body 10, a first cover casing 11a, and a second cover casing 11b, and both opened end of the casing body 10 is closed by the first cover casing 11a and the second cover casing 11b. The casing body 10, the first cover casing 11a, and the second cover casing 11b are each formed by resin materials such as ABS. A terminal 12 which is connected to an unillustrated lead wire is formed on an outer surface of the casing body 10.

An electromagnetic driving portion includes a yoke 20 of the casing-side electromagnetic driving portion 3, coils 21a and 21b, a magnet 30 of a movable-element-side electromagnetic driving portion, and pole pieces 31a and 31b. The yoke 20 formed by a cylindrical soft magnetic material is arranged along an inner circumference of the casing 2, and the first coil 21a and the second coil 21b are attached on an inner circumference of the yoke 20 and are electrically insulated from the yoke 20.

The first coil 21a and the second coil 21b are wound along the inner circumference of the yoke 20. The first coil 21a and the second coil 21b can each generate magnetic fields by conducting current from the terminal 12. Note that, when assembling the first coil 21a and the second coil 21b, they may be temporarily fixed on the yoke 20, and the first inner guide 6a and the second inner guide 6b by for example adhesives.

The first coil 21a and the second coil 21b surround the movable element 4 with a space between the coils 21a and 21b and the movable element 4. The movable element 4 is arranged to vibrate along the vibration axis (the axial direction of the casing 2). The movable element 4 includes the disk magnet 30, the first pole piece 31a and the second pole piece 31b arranged to sandwich the magnet 30, and a first mass (weight, spindle) 32a and a second mass (weight, spindle) 32b arranged to sandwich the magnet 30, the first pole piece 31a, and the second pole piece 32b.

The magnetization direction of the magnet 30 is the direction of the vibration axis O. The first pole piece 31a and the second pole piece 31b are formed of soft magnetic materials and are attached to the magnet 30 by for example magnetic adsorption force of the magnet 30 and adhesives. Through holes 31a1 and 31b1 along the vibration axis O are formed on respective center portions of the first pole piece 31a and the second pole piece 31b, and central protrusions 32a1 and 32b1 along the vibration axis O is formed on respective center portions of the first mass 32a and the second mass 32b corresponding to the first pole piece 31a and the second pole piece 31b. In addition, the first pole piece 31a and the first mass 32a, and the second pole piece 31b and the second mass 32b are integrated by press fitting the central protrusions 32a1 and 32b1 into the through holes 31a1 and 31b1.

In this way, the magnet 30, the first pole piece 31a, the second pole piece 31b, the first mass 32a, and the second mass 32b which form the movable element 4 are integrated. Note that the integration of the magnet 30, the first pole piece 31a, the second pole piece 31b, the first mass 32a, and the second mass 32b is not limited to the attachment by magnetic adsorption force, adhesives, and press-fitting as described above, and they may be integrated by fixing them by mechanical means such as screwing and other means.

The first mass 32a and the second mass 32b are formed of non-magnetic materials, and are formed by columns 32a2 and 32b2 extending in the vibration axis O direction, and bottomed cylinders 32a3 and 32b3 expanding from root portions of the columns 32a2 and 32b2 in the direction perpendicular to the vibration axis O and having a U-shape in cross section which have openings on the outside in the vibration axis O are formed.

As illustrated in FIG. 3, in the movable element 4, a shape of the magnet 30 is smaller in the radial direction than the first pole piece 31a, the second pole piece 31b, the first mass 32a, and the second mass 32b. That is, in the movable element 4, outer circumferences of the first pole piece 31a, the second pole piece 31b, the bottomed cylinder 32a3 of the first mass 32a, and the bottomed cylinder 32b3 of the second mass 32b are positioned at the most outer side and are positioned most closely to the inner circumferences of the first coil 21a and the second coil 21b.

The movable element formed in such a way is supported by both end in the vibration axis direction, that is, respective tips 32a4 and 32b4 of the first mass 32a and the second mass 32b are supported by the first supporting unit 5a and the second supporting unit 5b.

The first supporting unit 5a is formed by a first damper (first leaf spring) 40a and a first elastic component 41a provided in one surface of the first damper 40a.

As illustrated in FIG. 2, the first damper 40a includes a supporting portion 51a having a hole 50a (illustrated in FIG. 3) formed at the central portion thereof. The first damper 40a is connected to the movable element 4 through the hole 50a. In detail, the tip 32a4 of the first mass 32a is inserted in the hole 50a and is pressed and crushed to be crimped. Note that the fixing method of the first damper 40a and the movable element 4 is not limited to crimping and may be fixed (connected) by other methods such as screwing and adhesion.

Furthermore, the first damper 40a includes three arms 52a spirally extending to the outer circumference from the supporting portion 51a. Each of the arms 52a are formed around the vibration axis O at an equal pitch of 120°. Then, outer circumferential ends of each of the arms 52a are connected to an annulus frame 53a along the inner circumference of the casing body 10. The frame 53a are connected to a flange 13a (one of them is illustrated in FIG. 3) protruding to the inner side in the radial direction at three locations in the inner circumference of the casing body 10 at a pitch of 120° around the vibration axis O. In detail, a boss 14a standing up from the flange 13a is inserted into a insertion hole formed in the frame 53a of the first damper 40a, and a tip of the boss 14a is heated, pressurized and is pressed and crushed to be crimped. The fixing method of the frame 53a and the first damper 40 is not limited to crimping and may be fixed (connected) by other methods such as screwing and adhesion.

The first damper 40a is formed by one or a plurality of metal leaf spring, and in the present embodiment, for example, a processed stainless (spring material) thin plate is used. Materials for the first damper 40a are not limited to metal and may be composite materials including resins and fibers. Furthermore, it is desirable that materials for the first damper 40a are materials that are highly resistant to fatigue and have excellent flexibility.

The first damper 40a formed in such a way can elastically deform in the predetermined range in the crossing direction including the vibration axis O-direction and the radial direction which is vertical and perpendicular to the vibration axis O-direction. Note that this predetermined range is equivalent to the swinging range of the movable element 4 when normally used as the vibration actuator 1. Therefore, this predetermined range is a range in which the first damper 40a at least does not contact the casing 2 and is a range in which the elastic deformation of the first damper does not exceed limitation thereof.

As illustrated in FIG. 3, a first elastic component 41a has a plate shape along a shape from the supporting portion 51a of the first damper 40a to each arm 52a and is fixed on one surface of the first damper 40a. In detail, the first elastic component 41a is formed by a first adhesive layer formed of adhesives, a PE layer formed of PE (polyethylene), a second adhesive layer formed of adhesives, and an elastomer layer formed of elastomers (elastomers may be thermoplastic polyurethane elastomers (TPU), but are not limited thereto) stacked on the first damper 40a. Accordingly, the vibration of the first damper 40a is controlled by the elastic deformation (in the present embodiment, the shear deformation of the PE layer, and the bending deformation of the elastomer layer) of the first elastic component 41a. The fixing method of the first elastic component 41a and the first damper 40a is not limited to the above adhesion, and other fixing method such as heat welding of the resin first elastic component to the first damper 40a.

The second supporting unit 5b also has the configuration similar to the first supporting unit 5a and has a second damper 40b (second leaf spring) and a second elastic component 41b. Note that in the present embodiment, the second damper 40b and the first damper 40a have the same shape and material, and the second elastic component 41b and the first elastic component 41a has the same shape and material. As illustrated in FIG. 3, three arms 52b of the second damper 40b extend from the supporting portion 51b to which a hole 50a is formed to an annulus frame 53b. Then, the second damper 40b is connected to the movable element 4 by inserting a tip 32b4 of a second mass 32b in the hole 50b and pressing and crushing the tip 32b4 to crimp it. Furthermore, in the second damper 40b, the annulus frame 53b is connected to three flanges 13b protruding from the inner circumference of the casing 2 by inserting a boss 14b of the flange 13b into a through hole formed on the frame 53b and pressing and crushing the boss 14b to crimp it. Note that the spiral direction of each arm 52b of the second damper 40b is opposite the spiral direction of each arm 52a of the second damper 40a. By this, since the first damper 40a and the second damper 40b each apply torques opposite to each other to the movable element 4 during vibration, the movable element 4 is only displaced in the vibration axis O-direction and does not rotate around the vibration axis O.

(First Inner Guide 6a and Second Inner Guide 6b)

The first inner guide 6a is provided at one side in the vibration axis-O direction and is provided at other side (center side of the casing 2) than the first supporting unit 5a in the vibration axis-O direction. The second inner guide 6b is provided at other side in the vibration axis-O direction and is provided at one side (center side of the casing 2) than the second supporting unit 5b in the vibration axis-O direction. That is, as illustrated in FIG. 3, the first inner guide 6a and the second inner guide 6b are provided at the center side of the casing 2 in the vibration axis-O direction than the first supporting unit 5a and the second supporting unit 5b. The first inner guide 6a and the second inner guide 6b are, for example, formed of resin materials such as ABS. However, the materials of the first inner guide 6a and the second inner guide 6b are not limited to resin materials.

As illustrated in FIGS. 4a and 4b, the first inner guide 6a includes an annulus frame 60a along the inner circumference of the casing body 10, and steps 61a inclined spirally toward the inner side in the radial direction of the casing body 10 and toward the other side of in the vibration axis O-direction of the casing body 10 are formed at three locations at a pitch of 120° around the vibration axis O of the frame 60a. The spiral shape of the steps 61a are a shape along portions of the spiral shape of each arm 52a of the first damper 40a in the outer circumference side (base side), and the steps 61a has spaces therebetween such that the steps 61a do not contact each arm 52a when the first damper 40a is elastically deformed in the predetermined range and the steps 61a contact each arm 52a when the deformation of the first damper 40a exceeds the predetermined range.

In detail, each step 61a includes a sidewall 61aw forming a surface in parallel with the inner circumference of the casing body 10, and a bottom 61ab extending from the sidewall 61aw to the inner side in the radial direction. An inner edge of each bottom 61ab forms an inner circumferential circle (concentric circle) which has the same axis as the inner circumference of the casing body 10 when viewed from the top, and each sidewall 61a forms an arc-shape from the inner circumferential side of the casing body 10 toward the inner circumferential circle. When the deformation of the first damper 40a exceeds the predetermined range in the crossing direction of the vibration axis O, the sidewall 61aw contacts with the first damper 40a to restrict the movement thereof in the crossing direction, and when the deformation of the first damper 40a exceeds the predetermined range in the vibration axis O-direction, the bottom 61ab contacts with the first damper 40a to restrict the movement thereof in the vibration axis O-direction.

Furthermore, holes 62a for weight saving are formed in each step 61a. In addition, notches 63a which have shapes along the shapes of each flange 13a of the casing body 10 are formed at three locations at the outer circumferential edge side of the frame 60a of the first inner guide 6a along the shape of each flange 13a.

Furthermore, a lock 64a protruding toward the outer side in the radial direction from a part of the frame 60a is formed on the inner guide 6a. When the lock 64a engages with an opened recess of the casing body 10, the first inner guide 6a is positioned relative to the casing 2.

Furthermore, claws 67a protruding toward the center side in the vibration axis-O direction is formed at the back side of the frame 60a on portions where the notches 63b are not present. In the first inner guide 6a illustrated in FIG. 4a, the claws 67a are formed at three locations. The first inner guide 6a and the casing body 10 are joined, for example, by melting the claws 67a of the first inner guide 6a by ultrasonic welding and welding the claws 67a to the casing body 10. Note that by forming the casing body 10 and the first inner guide 10 (claws 67a) by the same resin material, they can be strongly joined to each other by welding. The material of the casing body 10 and the first inner guide 10 may be resin materials containing, for example, glass fibers. However, the joining method is not limited to welding, and other method such as adhesion by adhesive, crimping, and screwing may be used for joining.

Furthermore, an extending portion 65a which has substantially cylindrical shape and which extends from the inner edge of each steps 61a, that is, the inner edge of the bottom 61ab toward the center side in the vibration axis-O direction is formed in the first inner guide 6a. As illustrated in FIG. 3, the extending portion 65a is positioned between the first coil 21a and the movable element 4 and sandwiches and holds a part of the first coil 21a together with the casing 2. In detail, the extending portion 65a of the first inner guide 6a and the casing body 10 sandwich and hold an end of the first coil 21a at one side in the vibration axis O-direction. In the present embodiment, the extending portion 65a is positioned between the first coil 21a and the movable element 4 except for the center portion in the vibration axis o-direction of the vibration actuator 1, and the extending portion 65a does not cover the entire inner circumference of the first coil 21a and exposes the part of the first coil 21a inside the casing 2. Furthermore, in the present embodiment, the extending portion 65a of the inner guide 6a abuts the end of the first coil 21a at one side in the vibration axis O-direction, to hold the first coil 21a such that it does not come off from the casing body 10. Note that the extending portion does not have to directly abut the first coil 21a and may hold the first coil 21a indirectly via other components therebetween.

In the first inner guide 6a formed in such a way, the movable element 4 can move back and forth in the vibration axis-O direction at the inner side in the radial direction by the extending portion 65a.

The second inner guide 6b has the same shape as the first inner guide 6a, and the second inner guide 6b employs the configuration similar to that of the first inner guide 6a. That is, as illustrated in FIGS. 4a and 4b by reference signs in brackets for each part of the second inner guide 6b, each part of the first inner guide 6a and the second inner guide 6b correspond to each other. In detail, the second inner guide 6b includes an annulus frame 60b, and a step 61b including a sidewall 61bw and a bottom 61bb is formed in the frame 60b. Furthermore, holes 62b are formed in each step 61b, and notches 63b are formed in the frame 60b. In addition, a lock 64b protruding toward the outer side in the radial direction is formed in the frame 60b, the lock 64b and the casing body 10 are joined, and the casing body 10 and the second inner guide 6b are welded via each claw 67b of the frame 6b.

Furthermore, an extending portion 6bb which has substantially cylindrical shape and which extends toward the center side in the vibration axis o-direction is formed in the second inner guide 6b. The extending portion 65b is positioned between the second coil 21b and the movable element 4, and sandwiches and holds a part of the second coil 21b together with the casing 2. In FIG. 3, the extending portion 65b and the casing body 10 sandwich and hold an end of the second coil 21b at one side in the vibration axis O-direction. In the present embodiment, the extending portion 65b of the inner guide 6b abuts the end of the second coil 21b at the other side in the vibration axis O-direction, to hold the second coil 21b such that it does not come off from the casing body 10.

(Operation)

In the vibration actuator 1 configured as described above, as illustrated in FIG. 3, the movable element 4 supported by the first damper 40a and the second damper 40b is positioned in the center of the first coil 21a and the second coil 21b when the first coil 21a and the second coil 21b are not conducted.

To vibrate the movable element 4, an alternating current is conducted to the first coil 21a and the second coil 21b via the terminal 12 in a direction that alternately generates magnetic fields with reverse polarity. That is, a same pole is produced at a portion where the first coil 21a and the second coil 21b are adjacent to each other.

For example, in the case of polarity illustrated in FIG. 5, thrust toward the other side in the vibration axis O-direction indicated by a solid line A is produced on the movable element 4, and when the current flowing in the first coil 21a and the second coil 21b is reversed, thrust toward one side in the vibration axis O-direction (upward in FIG. 5) indicated by a dotted line B is produced on the movable element 4.

In this way, by conducting an alternating current in the first coil 21a and the second coil 21b, the movable element 4 receives biasing force by the first damper 40a and the second damper 40b from both side and vibrates along the vibration axis O.

Meanwhile, thrust produced on the movable element 4 basically corresponds to thrust applied based on Fleming's left hand rule. In the present embodiment, since the first coil 21*a* and the second coil 21*b* are fixed to the casing 2, thrust as a reaction force against force produced on the first coil 21*a* and the second coil 21*b* is produced on the movable element 4 to which magnet 30, etc. is attached.

Therefore, what contributes to the thrust is a horizontal component of magnetic flux of the magnet 30 of the movable element 4 (a component orthogonal to the axial direction of the magnet 30). In addition, the yoke 20 increases the horizontal component of magnetic flux of the magnet 30.

Accordingly, at the time of the normal vibration of the movable element 4, the first damper 40*a* and the second damper 40*b* elastically deforms in the predetermined range in the vibration axis O-direction and the radial direction, and the movable element 4, the first damper 40*a*, and the second damper 40*b* does not contact the first inner guide 6*a* and the second inner guide 6*b*.

On the other hand, for example, when apparatuses employing the vibration actuator 1 has an impact from outside by dropping, although the movable element 4 moves by excessive swinging such that the first damper 40*a* and the second damper 40*b* may move beyond the predetermined range, this movement is restricted because the movable element 4, the first damper 40*a*, and the second damper 40*b* contact the first inner guide 6*a* and the second inner guide 6*b*.

In detail, when the movable element 4 excessively swings to one side in the vibration axis O-direction than as is in FIG. 6*b* and the first damper 40*a* and the second damper 40*b* move beyond the predetermined range, the arm 52*b* of the second damper 40*b* contacts the bottom 61*bb* of the step 61*b* of the second inner guide 6*b*. By this, the movable element 4 is restricted from further moving in the vibration axis O-direction and is prevented from contacting the casing 2 (first cover casing 11*a*).

Furthermore, when the movable element 4 excessively swings to the other side in the vibration axis O-direction than as is in FIG. 6*a* and the first damper 40*a* and the second damper 40*b* move beyond the predetermined range, the arm 52*a* of the first damper 40*a* contacts the bottom 61*ab* of the step 61*a* of the first inner guide 6*a*. By this, the movable element 4 is restricted from further moving in the vibration axis O-direction and is prevented from contacting the casing 2 (second cover casing 11*b*).

Although not illustrated, when impact in the radial direction is applied to the casing 2, the movable element 4 also moves in the radial direction. In this case, the movable element 4 move in the radial direction, and when the first damper 40*a* and the second damper 40*b* move beyond the predetermined range, the arms 52*a* and 52*b* of the first damper 40*a* and the second damper 40*b* contact with the sidewalls 61*aw* and 61*bw* of the steps 52*a* and 52*b* of the first inner guide 6*a* and the second inner guide 6*b*.

Furthermore, even when the movable element 4 further moves in the radial direction, since the respective extending portions 65*a* and 65*b* of the first inner guide 6*a* and the second inner guide 6*b* are positioned between the coils 21*a* and 21*b*, and the movable element 4, the extending portions 65*a* and 65*b* contact with the movable element 4.

In this way, according to the vibration actuator 1 of the present embodiment, the first inner guide 6*a* and the second inner guide 6*b* can restrict the movement of the movable element 4 in the radial direction and prevents the movable element from contacting the first coil 21*a* and the second coil 21*b* of the casing-side electromagnetic driving portion 3 by the extending portions 65*a* and 65*b*. Note that both of the first damper 40*a* and the second damper 40*b* do not have to contact the corresponding first inner guide 6*a* and second inner guide 6*b*, and the same effect can be achieved when one of the first damper 40*a* and the second damper 40*b* is in contact.

Furthermore, since the extending portions 65*a* and 65*b* sandwich and hold the first coil 21*a* and the second coil 21*b* together with the casing 2, the first coil 21*a* and the second coil 21*b* can be mechanically held so that they would not come off from the casing 2. By this, the first coil 21*a* and the second coil 21*b* can be more strongly fixed when compared with, for example, a case in which the first coil 21*a* and the second coil 21*b* are attached by adhesive. In addition, the first coil 21*a* and the second coil 21*b* can be held even if adhesive is not used.

Furthermore, since the extending portions 65*a* and 65*b* do not cover the center portion of the first coil 21*a* and the second coil 21*b* in the vibration axis O-direction, the part of the first coil 21*a* and the second coil 21*b* is exposed inside the casing, so that the heat dissipation can be ensured and the insulation deterioration of the first coil 21*a* and the second coil 21*b* can be prevented.

Furthermore, since the first inner guide 6*a* and the second inner guide 6*b* restricts the movement of the first damper 40*a* and the second damper 40*b*, excessive swinging of the movable element 4 can be suppressed. In addition, since the first damper 40*a* and the second damper 40*b* are formed by leaf springs, the first damper 40*a* and the second damper 40*b* elastically deform when the first inner guide 6*a* and the second inner guide 6*b* contact the first damper 40*a* and the second damper 40*b*, such that the impact can be absorbed. Moreover, since the first inner guide 6*a* and the second inner guide 6*b* are provided at the inner side of the casing 2 than the first damper 40*a* and the second damper 40*b* in the vibration axis O-direction, the large-sizing of the casing 2 can be prevented. By this, the vibration actuator 1 can be prevented from being larger, and impact to the movable element 4 when there is impact from the outside can be suppressed.

In particular, the first inner guide 6*a* and the second inner guide 6*b* can suppress the excessive swinging of the movable element 4 in the vibration axis O-direction by restricting the movement of the first damper 40*a* and the second damper 40*b* in the vibration axis O-direction.

Furthermore, the first inner guide 6*a* and the second inner guide 6*b* can suppress the movement of the movable element 4 in the radial direction by restricting the movement of the first damper 40*a* and the second damper 40*b* in the crossing direction of the vibration axis O-direction including the radial direction of the casing 2.

Since the first inner guide 6*a* and the second inner guide 6*b* have the steps 61*a* and 61*b* having the spiral shape which corresponds to the spiral shape of the arms 52*a* and 52*b* of the first damper 40*a* and the second damper 40*b* and which has the vibration axis O-direction as the center, the movement of the first damper 40*a* and the second damper 40*b* in the vibration axis O-direction and the crossing direction of the vibration axis O while coping with the shape of the first damper 40*a* and the second damper 40*b*. In addition, since the steps 61*a* and 61*b* have the bottoms 61*ab* and 61*bb* having the shape along the shape of the arms 52*a* and 52*b* at the time of the vibration of the movable element 4, the surface of the arms 52*a* and 52*b* can be in contact with the surface of the bottoms 61*ab* and 61*bb*, so that the impact can be dispersed.

Furthermore, since the first inner guide 6*a* is positioned between the first coil 21*a* and the first damper (first leaf spring) 40*a* in the swinging range of the movable element 4, and the second inner guide 6b is positioned between the second coil 21b and the second damper (second leaf spring) 40b in the swinging range of the movable element 4, the coils 21a and 21b can be prevented from contacting the first damper 40a and the second damper 40b.

Furthermore, since the first damper 40a and the second damper 40b supporting both side of the movable element 4 are provided, and the corresponding first inner guide 6a and second inner guide 6b restrict the first damper 40a and the second damper 40b in the vibration axis O-direction toward one side and the other side, and the space for the inner guides can be reduced and the inner guides can be downsized.

Although description for the embodiments of the present disclosure is completed, aspects of the present disclosure are not limited to the embodiments.

For example, although the shape of the extending portions 65a and 65b of the first inner guide 6a and the second inner guide 6b are substantially cylindrical shape, the shape of the extending portions are not limited thereto. The shape of the extending portions may be other shapes such as shapes having a slit, as long as the extending portions sandwich and hold the coils 21a and 21b together with the casing 2 and is positioned between the movable element 4 and the coils 21a and 21b to prevent the movable element 4 from contacting the first coil 21a and the second coil 21b. In addition, although in the first inner guide 6a and the second inner guide 6b of the above embodiment, the claws 67a and 67b respectively formed in the frames 60a and 60b are welded and joined to the casing body 10, numbers and positions of the claws are not limited thereto, and structures thereof are not limited as long as they can be joined to the casing.

Furthermore, in the above embodiment, although the first supporting unit 5a and the second supporting unit 5b includes the first elastic component 41a and the second elastic component 41b, the first elastic component 41a and the second elastic component 41b may not be employed.

Furthermore, although in the above embodiment, the casing 2 has the cylindrical shape and the movable element 4 has the substantially columnar shape, the shapes of the casing and the movable element are not limited thereto and may be other shapes such as polygons.

Furthermore, although in the above embodiment, the first damper 40a and the second damper 40b having the spiral arms 52a and 52b are used as the first supporting unit 5a and the second supporting unit 5b supporting the movable element 4, other lead springs may be used as the supporting unit. For example, leaf springs having an irregular spiral-shape in which curved line and straight line are combined, a cross-shape, and a swastika-shape may be used. In this case, the shape of the inner guides is a shape along the shape of the lead spring.

The invention claimed is:

1. A vibration actuator comprising:
a cylindrical casing having a coil and a cylindrical yoke formed by soft magnetic material, wherein the coil is attached on an inner circumference of the yoke;
a movable element having a magnet, wherein the movable element is arranged inside the casing and surrounded by the coil to vibrate along a vibration axis of the vibration actuator, and the vibration axis being an axial direction of the casing; and
an inner guide formed by resin, attached to the casing, and having an extending portion which sandwiches and holds an end of the coil together with the casing,
wherein the extending portion extends between the coil and the movable element, abuts an inner circumference of the coil at the end of the coil and does not abut the cylindrical yoke when the inner guide is attached to the casing,
wherein the extending portion is positioned between the coil and the movable element except for a center portion of the movable element in the vibration axis direction of the vibration actuator, the extending portion does not cover an entire inner circumference of the coil, and the extending portion exposes an other end of the coil to an inside of the casing.

2. The vibration actuator according to claim 1, wherein:
the casing and the inner guide are formed by same resin material, and
the casing and the inner guide are welded to each other.

3. The vibration actuator according to claim 1, further comprising a leaf spring having a plurality of arms which supports the movable element inside the casing,
wherein the inner guide is positioned inside the casing closer to a center-side of the casing than the leaf spring in the axial direction and restricts a movement of the leaf spring.

4. The vibration actuator according to claim 1, wherein:
the coil includes a first coil provided at one side in the axial direction of the casing and a second coil provided at other side in the axial direction of the casing, and
the inner guide includes a first inner guide arranged between the first coil and the movable element and having the extending portion which sandwiches and holds the first coil together with the casing, and a second inner guide arranged between the second coil and the movable element and having the extending portion which sandwiches and holds the second coil together with the casing.

* * * * *